United States Patent
Ganesan et al.

(10) Patent No.: US 7,596,099 B2
(45) Date of Patent: Sep. 29, 2009

(54) METHOD AND APPARATUS FOR MANAGING A COMMUNICATION LINK

(75) Inventors: Eshwar Prasad Ganesan, Wheeling, IL (US); Murali Ranganathan, Phoenix, AZ (US); Jeffrey L. Borneman, Glen Ellyn, IL (US); Moid M. Kunwer, Sugarland, TX (US)

(73) Assignee: Motorola, Inc., Schaumburg, IL (US)

( * ) Notice: Subject to any disclaimer, the term of this patent is extended or adjusted under 35 U.S.C. 154(b) by 677 days.

(21) Appl. No.: 11/210,031

(22) Filed: Aug. 22, 2005

(65) Prior Publication Data
US 2007/0060186 A1 Mar. 15, 2007

(51) Int. Cl.
H04L 12/26 (2006.01)
(52) U.S. Cl. ...................................... 370/252
(58) Field of Classification Search ................. 370/252; 714/48; 356/73.1; 716/5
See application file for complete search history.

(56) References Cited

U.S. PATENT DOCUMENTS

| 4,633,411 | A | 12/1986 | Bliss et al. | |
| 6,097,732 | A | 8/2000 | Jung | |
| 6,782,742 | B1* | 8/2004 | Adebjork et al. | 73/170.01 |
| 6,987,737 | B2 | 1/2006 | Castellano et al. | |
| 2004/0046955 | A1* | 3/2004 | Fayolle et al. | 356/73.1 |
| 2004/0193964 | A1* | 9/2004 | Robinson et al. | 714/48 |
| 2005/0060675 | A1* | 3/2005 | Tetelbaum | 716/5 |

* cited by examiner

Primary Examiner—Derrick W. Ferris
Assistant Examiner—Stephen W Brown

(57) ABSTRACT

A method and apparatus of managing a communication link may include monitoring at least one of a plurality of physical links and a plurality of communication links associated with a plurality of data communications, calculating a statistical quantity of a noise element of a selected one or more of at least one of the plurality of physical links and the plurality of communication links at a plurality of first time intervals, measuring the noise element of the selected one or more of at least one of the plurality of physical links and the plurality of communication links at a second time interval, determining whether the noise element measured at the second time interval has exceeded a first noise threshold, and communicating an alert notification when the first noise threshold is exceeded.

22 Claims, 3 Drawing Sheets

200

METHOD AND APPARATUS FOR MANAGING A COMMUNICATION LINK

BACKGROUND OF INVENTION

In any communication system, high levels of noise may result in data loss or significant degradation of the quality of data such that the resulting data is unusable. For example, in video or voice applications, noise may cause video data to be unviewable and voice data to be inaudible. Further in the prior art, data traffic that experiences significant noise conditions may require boosting signal strength, which reduces system capacity, or retries, which expends limited network resources.

Current methods of detecting noisy communication links are overly simplistic given the complex and varying nature of noise encountered. For example, current methods of detecting noise do not take into account the Gaussian distribution of noise and its accompanying unpredictability.

Accordingly, there is a need not met in the prior art, for a method and apparatus of monitoring noise on a communication link.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 1:
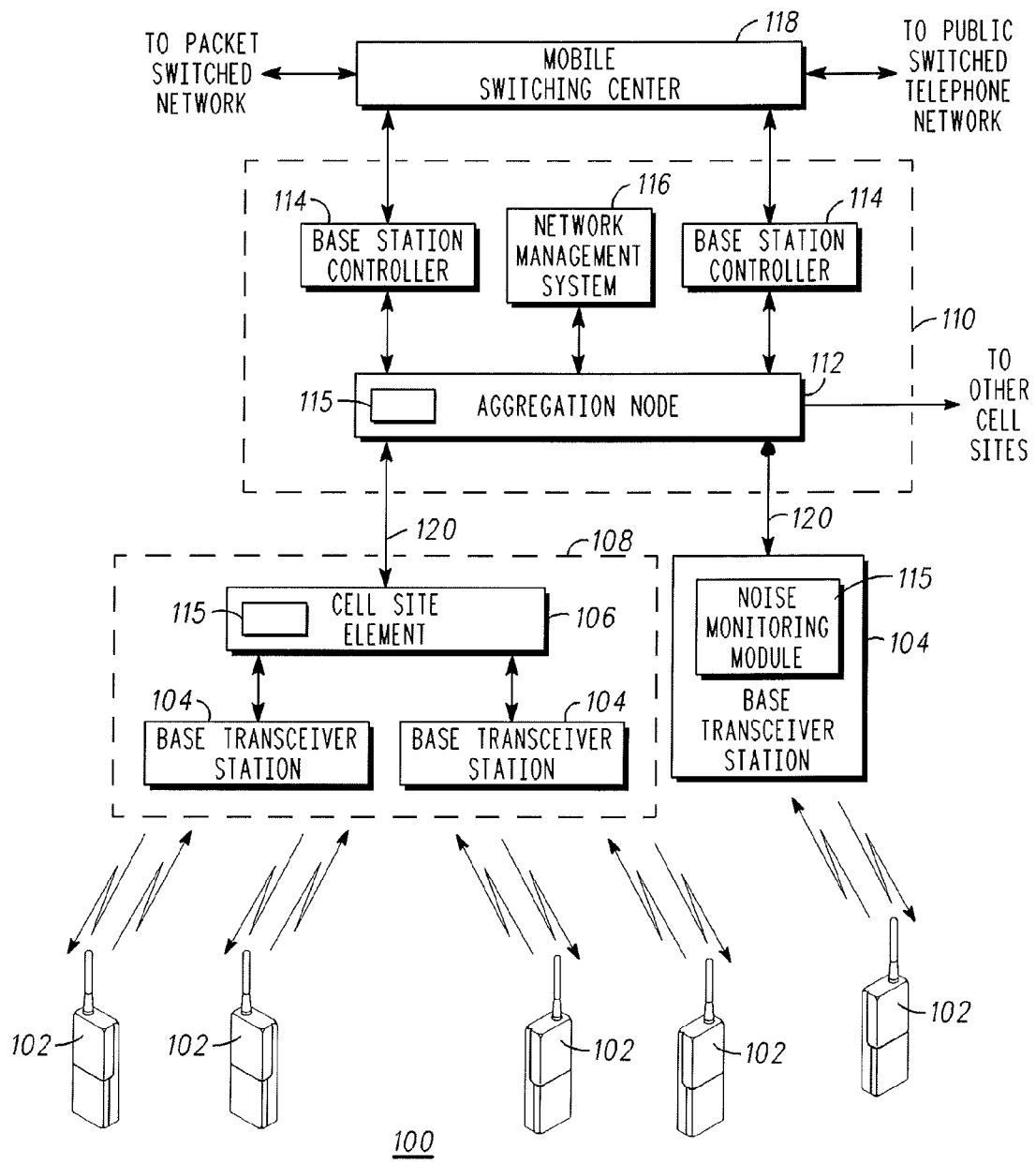
FIG. 1 representatively illustrates a simplified block diagram of a communication system in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements (hardware or software), and the description herein is merely representational of one embodiment.

Software blocks that perform embodiments of the present invention can be part of computer program modules comprising computer instructions, such control algorithms that are stored in a computer-readable medium such as memory. Computer instructions can instruct processors to perform any methods described below. In other embodiments, additional modules could be provided as needed.

A detailed description of an exemplary application is provided as a specific enabling disclosure that may be generalized to any application of the disclosed system, device and method for monitoring noise on a communication link in accordance with various embodiments of the present invention. In an embodiment, the invention provides a method and apparatus to derive statistical characteristics of a noise source and adjust communication link alarming and removal thresholds.

In an embodiment, data, as used herein in this document, may refer to any type of numeric, voice, video, audio-visual, or script data, or any type of source or object code, or any other suitable information in any appropriate format that may be communicated from one point to another.

Physical 'link' or 'span' refers to any communication wire, cable, fiber, line, conduit, passage, or pathway operable to carry or communicate information or data in any appropriate format. In an embodiment, 'communication link,' as used herein this document, may refer to logical communication channels that operate over physical links, for example control links, software channels, and the like. Unless stated otherwise, 'link,' 'communication link' and 'plurality of communication links,' and the like, refer to the logical channels operated by software and not to the physical link itself. In an embodiment, a communication link has a corresponding physical link.

FIG. 1 representatively illustrates a simplified block diagram of a communication system 100 in accordance with an exemplary embodiment of the present invention. Communication system 100 may include a plurality of cell sites 108, a plurality of mobile stations 102, a central office site 110, a plurality of base transceiver stations 104, a plurality of cell site elements 106, and a network management system 116. Additionally, communication system 100 may include one or more aggregation nodes 112, a plurality of base station controllers 114, a mobile switching center 118 coupled a public switched telephone network (PSTN) and/or a packet switched network such as an Internet Protocol (IP) network, and the like.

Communication system 100 may be configured to represent a 2.5G architecture applicable to a Global System for Mobile (GSM) environment in accordance with a particular embodiment of the present invention. In another embodiment, a 2.5G architecture is offered for purposes of example and may alternatively be substituted with any suitable networking system or arrangement that provides a communicative platform for communication system 100. For example, the present invention may be used in conjunction with a first generation or 3G network, where first generation or 3G equivalent networking equipment is provided in the architecture. Communication system 100 may be used in a host of communication environments such as in conjunction with any time division multiple access (TDMA) element, code division multiple access (CDMA) element or protocol for example, whereby signals from end users, subscriber units, or mobile stations 102 may be multiplexed.

Communication system 100 may be configured to represent a Interim Standard IS-95 based second a half generation (2.5G) architecture applicable to a Global System for Mobile (GSM) Communications environment in accordance with a particular embodiment of the present invention. In another embodiment, a 2.5G architecture is offered for purposes of example and may alternatively be substituted with any suitable networking system or arrangement that provides a communicative platform for communication system 100. For example, the present invention may be used in conjunction with a first generation or International Mobile Telecommunications IMT-2000 standard Wideband Code Division Multiple Access (WCDMA) third generation Partnership Project (3G) network, where first generation or 3G equivalent networking equipment is provided in the architecture. Communication system 100 may be used in a host of communication environments such as in conjunction with any time division multiple access (TDMA) element, code division multiple access (CDMA) element or protocol for example, whereby signals from end users, subscriber units, or mobile stations 102 may be multiplexed.

In an embodiment, where only a single communication link associated with a data exchange remains, communication system 100 may allow the final link to be left operational. Notifications of link additions/removals may be directed to nodes that may then adjust the total throughput (i.e. reduce the allowed number of voice, video, or data calls, redistribute information to other web servers or other links to handle transactions, etc.) across the network. In another embodiment, where only a single communication link remains, communication system 100 may remove the final communication link. Removing the final link may force all new bearer traffic to another base transceiver station (BTS) or mobile station for better "quality" instead of allowing traffic, even with less throughput to suffer degraded performance.

Mobile station 102 may be an entity, such as a client, subscriber, end user, or customer that seeks to initiate a communication session or data exchange in communication system 100 via any suitable network. Mobile station 102 may operate to use any suitable device for communications in communication system 100. Mobile station 102 may further represent a communications interface for an end user of communication system 100. Mobile station 102 may be a cellular or other wireless telephone, an electronic notebook, a computer, a personal digital assistant (PDA), or any other device, component, or object capable of initiating a data exchange facilitated by communication system 100. Mobile station 102 may also be inclusive of any suitable interface to the human user or to a computer, such as a display, microphone, keyboard, or other terminal equipment. Mobile station 102 may alternatively be any device or object that seeks to initiate a communication on behalf of another entity or element, such as a program, a database, or any other component, device, element, or object capable of initiating a voice or a data exchange within communication system 100.

Base transceiver stations 104 are communicative interfaces that may comprise radio transmission/reception devices, components, or objects, and antennas. Base transceiver stations 104 may be coupled to any communications device or element, such as mobile station 102 for example. Base transceiver stations 104 may also be coupled to base station controllers 114 (via one or more intermediate elements) that use a landline (such as a T1/E1 line, Ethernet, OCn fiberoptic, and the like) interface. A non-limiting example of this may be backhaul communication link 120. In another embodiment, base transceiver stations 104 may operate as a series of complex radio modems where appropriate. Base transceiver stations 104 may also perform transcoding and rate adaptation functions in accordance with particular needs.

In operation, communication system 100 may include multiple cell sites 108 that communicate with mobile stations 102 using base transceiver stations 104 and cell site element 106. Central office site 110 may use aggregation node 112 and base station controllers 114 for communicating with cell site 108. One or more network management systems 116 may be coupled to either cell site 108 and central office site 110 (or both as desired), whereby mobile switching center 118 provides an interface between base station controllers 114 (of central office site 110) and PSTN, packet switched network, and/or any other suitable communication network. Base transceiver stations 104 may be coupled to cell site element 106 by an Ethernet link or any other suitable communication link or element operable to facilitate data exchanges. A backhaul communication link 120 between cell site element 106 and aggregation node 112 (or between BTS 104 and aggregation node 112) may also include a suitable physical link (e.g. T1/E1 line, T3/E3 line, OCn fiberoptic, and the like).

Base station controllers 114 may operate as management components for a radio interface. This may be done through remote commands to a corresponding base transceiver station (e.g. base transceiver station 104) within communication system 100. One base station controller 114 may manage more than one base transceiver station 104. Some of the responsibilities of base station controllers 114 may include management of radio channels and assisting in handover scenarios.

In operation, layer two based traffic may be communicated by each base transceiver station 104 (using a logical channel, i.e. communication link, over a physical link) to cell site element 106 of cell site 108. Cell site element 106 may multiplex payloads together from the layer two based traffic that have a common destination. This may be done, for example and without limitation, using one or more Digital Access Cross-connect Switches (DACS). The multiplexed payloads as well as any payloads extracted from the network management system (e.g. IP or Ethernet traffic) may be communicated across a communication link to aggregation node 112 within central office site 110. Aggregation node 112 may also include a DACS to demultiplex the payloads for delivery to an appropriate base station controller 114 or network management system 116 and to translate from one physical link to another (i.e. from T1 to OCn or T3, and the like).

Mobile switching center 118 may operate as an interface between PSTN and base station controllers 114, and potentially between multiple other mobile switching centers in a network and base station controller 114. Mobile switching center 118 represents a location that generally houses communication switches and computers and ensures that its cell sites in a given geographical area are properly connected. Cell sites refer generally to the transmission and reception equipment or components that connect elements such as mobile station 102 to a network. By controlling transmission power and radio frequencies, mobile switching center 118 may monitor the movement and the transfer of a wireless communication from one cell to another cell and from one frequency or channel to another frequency or channel. In a given communication environment, communication system 100 may include multiple mobile switching centers 118 that are operable to facilitate communications between base station controllers 114 and PSTN. Mobile switching center 118 may also generally handle connection, tracking, status, billing information, and other user information for communications in a designated area where appropriate.

PSTN represents a worldwide telephone system that is operable to conduct or facilitate communications. PSTN may be any land line telephone network operable to facilitate communications between two entities, such as two persons, a person and a computer, two computers, or in any other environment in which data is exchanged for purposes of communication. According to one embodiment of the present invention, PSTN may operate in a wireless domain, facilitating data exchanges between mobile station 102 and any other suitable entity within or external to communication system 100.

Packet switched network may be a series of points or nodes of interconnected communication paths for receiving and transmitting packets of information that propagate through communication system 100. Packet switched network offers a communications interface between mobile stations 102 and any other suitable network equipment. Packet switched network may be any local area network (LAN), metropolitan area network (MAN), wide area network (WAN), wireless local area network (WLAN), virtual private network (VPN), or any other appropriate architecture or system that facilitates communications in a network environment. Packet switched network implements a transmission control protocol/internet protocol (TCP/IP) communication language protocol in a particular embodiment of the present invention. However, packet switched network may alternatively implement any other suitable communications protocol (e.g. frame relay, X.25, asynchronous transfer mode (ATM), etc.) for transmitting and receiving data packets within communication system 100.

Aggregation node 112 and cell site element 106 are network elements that may share one or more of the same functionalities and/or capabilities. For purposes of example and teaching only, a noise monitoring module 115 may be described as being positioned in at least one of aggregation node 112 and/or cell site element 106. In another embodiment, noise monitoring module 115 may be distributed between cell site element 106 and aggregation node 112. In yet another embodiment, noise monitoring module 115 may be integrated with BTS 104, where BTS 104 does not include a separate cell site element. In this embodiment, the features of cell site 108 and cell site element 106 may be integrated with BTS 104.

Alternatively, such a capability may be provided in any other suitable location of communication system 100 or provided separately as its own distinct structure, device, component, module, element or object. It is also critical to note that the use of the terms 'aggregation node' and 'cell site element' herein in this document only connotes an example representation of one or more elements associated with base transceiver station 104 and base station controller 114. These terms have been chosen arbitrarily and offered for purposes of teaching only and do not necessarily imply any particular architecture or configuration. Moreover, the terms 'cell site element' and 'aggregation node' are intended to encompass any network element operable to facilitate a data exchange in a network environment. Accordingly, cell site element 106 and aggregation node 112 may be routers, switches, bridges, gateways, load-balancers, interfaces, or any other suitable module, device, component, element or object operable to effectuate one or more of the operations, tasks, or functionalities associated with monitoring noise data as implied, described, provided, or offered herein.

In an embodiment, noise monitoring module 115 in cell site element 106 and/or aggregation node 112 or BTS 104 may monitor an element (e.g. a controller chip) that controls the backhaul communication link 120. Cell site element 106 and/or aggregation node 112 may monitor various errors being reported there and, in a particular embodiment, monitor line code violations, path code violations, bi-polar violations, or excessive zeros that occur. Alternatively, cell site element 106 and/or aggregation node 112 or BTS 104 may monitor any other suitable errors or noise parameters in accordance with particular needs (link alarms or higher level application indicators such as dropped packets, retransmission requests, and the like). When the physical link and/or the communication link becomes noisy, a warning signal may be communicated over the communication link to an administrator or a network operator such that he is made aware of the possible deterioration in quality of data. The alert signal may also be communicated to an administration module (that may be provided in any suitable location within communication system 100) that reports or consolidates such information to be reviewed by an administrator, network operator, or any other suitable entity. Considerable flexibility is provided to an end user or network administrator in configuring any number of parameters that result in a notification or removal operation being implemented. For example, a network administrator may configure a given time interval where the number of errors is being detected. Additionally, a network administrator or system operator may decide to set a parameter based on a percentage of information or data being received. Considerable versatility and flexibility is granted by the architecture of the present invention in that any noise criteria (e.g. noise data associated with time, percentage error, error number, throughput, etc.) may be implemented by communication system 100.

At cell site element 106 and/or aggregation node 112 or BTS 104, an alert notification may be generated that indicates a particular severity in noise associated with a physical link or error associated with a communication link. The alert notification (via a configuration command) may be converted into an appropriate signal to be sent via a simple network management protocol (SNMP) to a suitable application that may consolidate monitoring functions of a network. Alternatively, this signal or notification may be sent to any suitable entity, module, element, or object operable to authorize or otherwise control managerial functions or administration parameters associated with a network or a communication link. A corresponding element may, in turn, filter elements (as it may be configured to do) or pass the alert notification up to a higher level of management. Additionally, the alert notification may trigger a suitable protocol for networking equipment or gear to execute some action based on the signal. Such alert notifications may be passed on to suitable maintenance, control, and fault mechanisms that identify and process the signal such that the error condition or noise parameter may be addressed. The alert notification may also flag the logging of error messages to a console or controller. The protocol may be applicable to any type of layer one medium that allows for the gathering or reporting of physical layer statistics associated with error conditions or noise. For cyclic redundancy check (CRC) errors, a path code violation counter may be incremented. One or more counters may be provided to cell site element 106 and/or aggregation node 112 in order to achieve this operation.

In operation of an example embodiment, a method for detecting errors may be effectuated by monitoring noise at the physical layer of each network interface and/or error over the corresponding communication link. This can be achieved, for example, by monitoring the bit errors rates and network CRC errors. Communication system 100 provides considerable flexibility in that noise tolerance levels can be configured based on any number of parameters, such as layer one error threshold including a number of errors per sample period, sample period, number of samples, or percent of errored samples for example.

A periodic timer included within cell site element 106 and/or aggregation node 112 or BTS 104 (or provided at any other suitable location) may monitor the physical layer according to the current settings or designations associated with error tolerances and initiate the appropriate action when tolerances are exceeded (e.g. cause alert notifications, notify a higher layer of actions that were [or that should be] taken, etc.). A higher layer timer monitor element may also be provided to monitor the number of links and network utilization, and to adjust the tolerances of the links, as needed, based on current system conditions or particular networking needs.

Such a configuration allows noise associated with multiple network links to be managed collectively as a group, rather than as separate entities. In another embodiment, individual communication links may be managed individually within a bundle of communication links. The architecture of communication system 100 may further allow tolerable loss to be designated or otherwise selected based on the particular customer's network environment, system performance characteristics, or particular data transmission needs. For example, the integrity of real-time voice data requires more sensitive (i.e. lower threshold) system configuration as compared to higher thresholds associated with simple data traffic.

Cell site element 106 and/or aggregation node 112 or BTS 104 may include a noise monitoring module 115, in accordance with one embodiment of the present invention that implements one or more noise monitoring tasks as described herein. Noise monitoring module 115 may include any suitable hardware, software, algorithms, objects, or elements operable to facilitate the functionality or operations thereof.

Noise monitoring module 115 may monitor the link quality of individual communication links (i.e. logical links) within a multilink bundle, for example and without limitation backhaul communication link 120. Noise monitoring module 115 may provide the ability to issue a warning or an alert on reaching a certain level of noise, and further remove the communication link based on a second level of noise. Conversely, once the level of noise improves to a certain level of quality, the communication link may be restored to service, which may be accompanied by an indication of improved communication quality to be communicated to any appropriate source or location.

In an example embodiment, noise monitoring module 115 may include two monitoring aspects. The first is a link warning element that may include a monitor that provides the capability to issue a warning when the communication link surpasses a configured level of noise. A notification may then be given when the link noise level improves to a second configured level of noise. The second is a link removal element that may include a monitor that provides the capability to remove a communication link from service in the bundle and, further, to issue an error when the communication link surpasses a configured level of noise. The communication link may be restored and a notice issued when the link noise level improves below a second configured level of noise. Both warning and removal types of monitors may include two thresholds and/or durations. The first threshold and duration may operate to cause the error condition. The second threshold and duration may operate to clear the error condition.

When only one active communication link remains in the multilink bundle, an optional attempt may be made to maintain this communication link in service by issuing an alert rather than removing the communication link from service when the link removal level of noise is reached. The T1 standard error rate may be in effect, where appropriate, in order to remove the final link from service. In another embodiment, the last communication link in a multilink bundle may be removed with traffic being redirected to another BTS 104. For example and without limitation, the last communication link in the multilink bundle may be dropped with the traffic data being directed to an available BTS 104 having a higher or highest quality signal (low Bite Error Rate (BER), and the like).

In general, noisy communication links may be removed based on the Bit Error Ratio (BER) of individual or multiple physical links. Such a BER may be reflected by Line Code Violation (LCV) or Path Code Violation (PCV) errors. An LCV is an occurrence of either a Bi-Polar Violation (BPV) or an Excessive Zeroes (EXZ) Error. Additionally, noise monitoring module 115 may implement or involve any other suitable violation or error condition or characteristic. In an embodiment, BER in one or both directions over physical link may be monitored for exceeding the various noise thresholds.

Two options may be included within noise monitoring module 115, one for link warning and one for link removal operations. These two options may also be configured independently of each other where appropriate. Either or both may be used in a configuration in accordance with particular needs. Each option may be entered in two forms: the error condition and the clear condition.

Both the warning and the removal conditions may cause a notification to be generated upon the threshold being exceeded for the sample duration. In addition, notification messages may be generated when their clear thresholds are reached for the clear sample duration. For the removal/restore conditions, if it is the last communication link in a multilink bundle, different remove notifications and severities may be presented in order to indicate the thresholds were surpassed, but no removal/restore occurred. Once a warn or remove noise level has been exceeded, and the associated notification generated, the notification may not occur again until its corresponding clear level has been reached and the clear notification is issued. The notification may be marked with a timestamp provided by any suitable protocol such as an input output supervision (IOS) protocol for example.

Figure 2A:
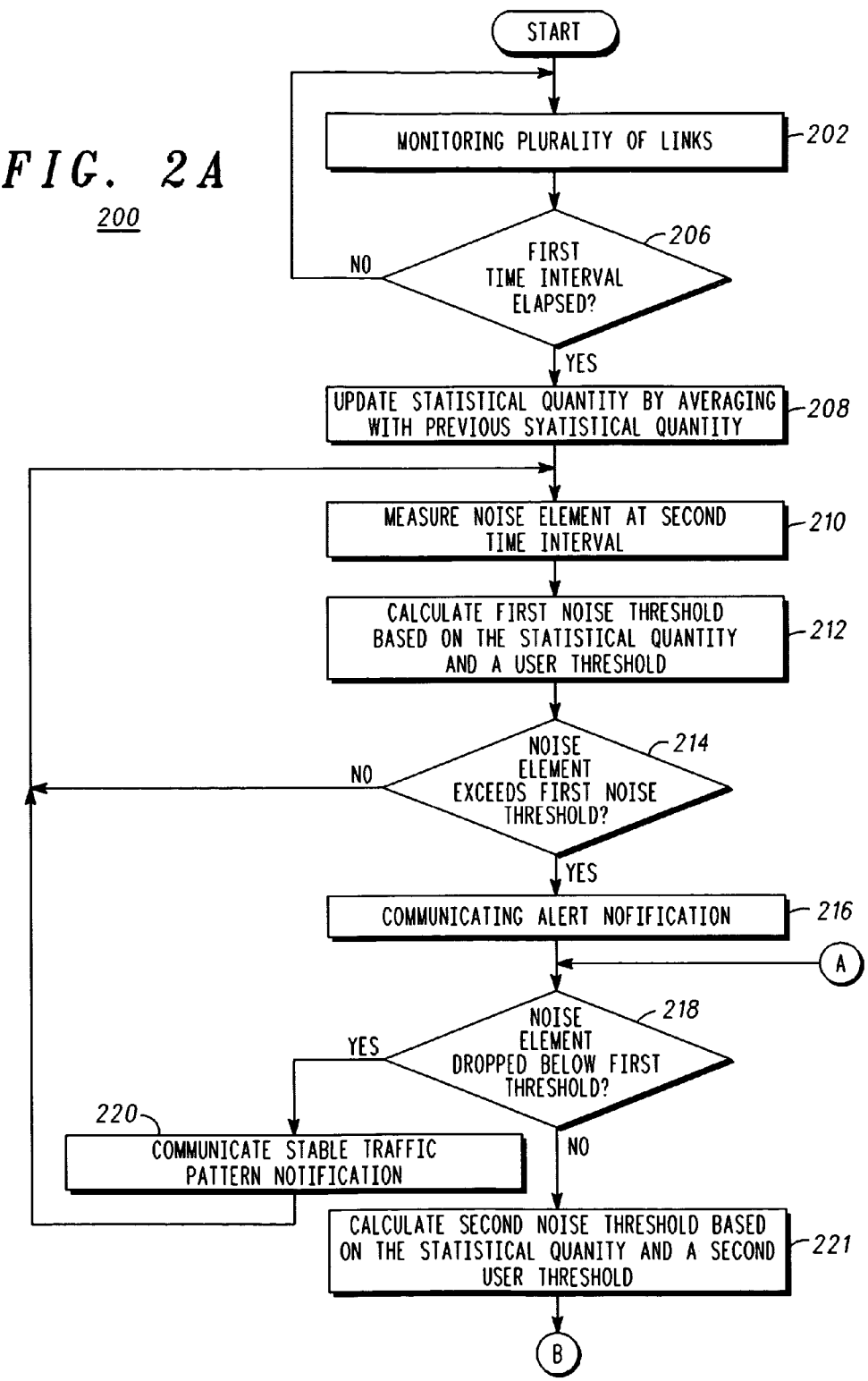
FIGS. 2A and 2B representatively illustrate a flow diagram with exemplary steps associated with a method of the invention in accordance with an exemplary embodiment of the present invention.
Figure 2B:
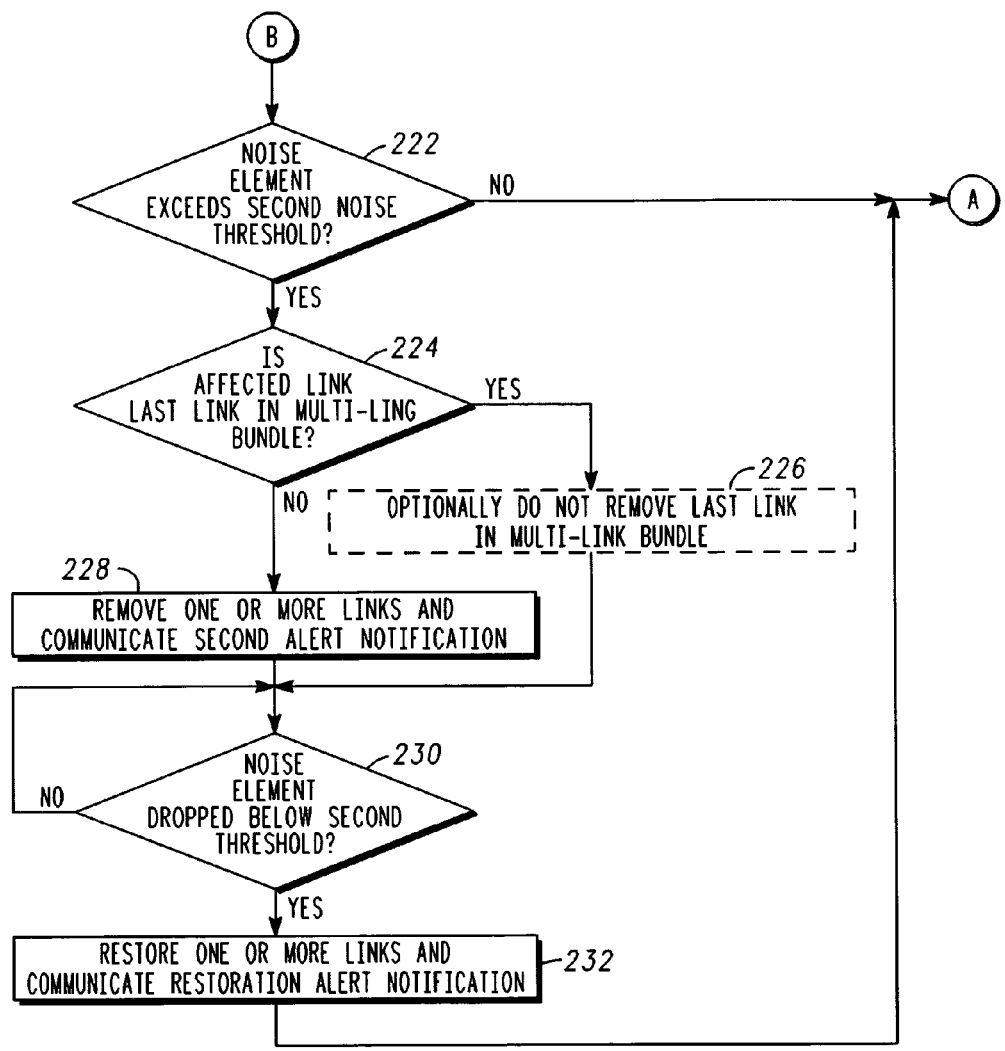

FIGS. 2A and 2B representatively illustrate a flow diagram with exemplary steps associated with a method of the invention in accordance with an exemplary embodiment of the present invention. In step 202, at least one of a plurality of physical links and a plurality of communication links are monitored that are associated with a plurality of data communications. The plurality of communication links may correspond to the plurality of physical links. These may be, for example and without limitation, a plurality of physical links and communication links making up a bundle of backhaul communication links 120. In step 206, it is determined if a first time interval has elapsed. If not, monitoring of the plurality of physical links and/or communication links continues. If so, a statistical quantity of a noise element is calculated for a selected one or more of at least one of the plurality of physical links or the plurality of communication links in step 208. For example, in an embodiment, a statistical quantity may be calculated for each communication link in a multilink bundle.

In an embodiment, noise element can be the BER or any parameter discussed above used to derive BER. In another embodiment, noise element may be a time interval associated with one or more of the plurality of physical links. In yet another embodiment, noise element may be a percentage of errors or a number of errors associated with one or more of plurality of physical links or the plurality of communication links.

First time interval may be any interval set by a system administrator, user, and the like, for example and without limitation thirty minutes, and the like. In an embodiment, plurality of physical links and/or the plurality of communication links are monitored with the statistical quantity calculated using data gathered over a first time interval. In an embodiment, statistical quantity may be a standard deviation of noise element as measured on selected one or more of at least one of the plurality of physical links or the plurality of communication links. In an embodiment, standard deviation may be one, two or more standard deviations of noise element as needed for any particular system architecture or monitoring criteria.

In an embodiment, in step 208, statistical quantity is updated by averaging with a statistical quantity calculated over a previous first time interval. For example, the standard deviation of noise element as measured over one of a first time interval may be averaged with the standard deviation of noise element measured over a previous first time interval. In another embodiment, the standard deviation of noise element as measured over one of a first time interval may be averaged with one or more standard deviations as measured over multiple previous first time intervals respectively. In yet another embodiment, statistical quantity may include a weighted average of each of a standard deviation of noise element at two or more of first time intervals respectively.

In step 210, noise element is measured at a second time interval. Second time interval may be any interval set by a system administrator, user, and the like, for example and without limitation, ten seconds. In step 212, a first noise threshold is calculated based on a user threshold and the statistical quantity calculated above. In an embodiment, user threshold may be a threshold of noise element set by a user or system administrator, which may represent a level where noise element is deemed to unacceptably interfere with one or more of plurality of communication links.

In an embodiment of step 212, first noise threshold may be calculated by subtracting statistical quantity from user threshold. In one embodiment, first noise threshold may be a user threshold minus a standard deviation of noise element (or an average or weighted average of standard deviations as described above). It is clear that unlike the prior art, first noise threshold is not fixed, but changes depending on statistical quantity. Further, first noise threshold may be updated and changed based on a more representative sample of noise element that is being encountered in selected one or more of plurality of communication links. This is because first noise threshold is a function of a standard deviation of noise element actually measured over one or more communication links.

In step 214 it is determined if noise element measured at second time interval has exceeded first noise threshold calculated in step 212. If not, statistical quantity continues to update as described above and noise element is continually measured at second time interval as per the return arrow. If noise element does exceed first noise threshold, then an alert notification is communicated by noise monitoring module per step 216. In an embodiment, alert notification may be communicated to network management system, mobile switching center, a system administrator, and the like, as described above.

In step 218 it is determined if noise element as measured at second time interval has dropped below first noise threshold. If so, a stable traffic pattern notification may be communicated to network management system, mobile switching center, a system administrator, and the like per step 220. If not, in an embodiment of step 221, second noise threshold may be calculated by subtracting statistical quantity from a second user threshold. In one embodiment, second noise threshold may be a second user threshold minus a standard deviation of noise element (or an average or weighted average of standard deviations as described above). It is clear that unlike the prior art, second noise threshold is not fixed, but changes depending on statistical quantity. Further, second noise threshold may be updated and change based on a more representative sample of noise element that is being encountered in selected one or more of a plurality of communication links. This is because second noise threshold is a function of a standard deviation of noise element actually measured over one or more communication links.

In step 222 it is determined if noise element has exceeded second noise threshold. In an embodiment, second noise threshold may be calculated by subtracting statistical quantity from a second user threshold. In one embodiment, second noise threshold may be a second user threshold minus a standard deviation of noise element. Analogous to user threshold above, second user threshold may be a threshold of noise element set by a user or system administrator, which may represent a level where noise element is deemed to unacceptably interfere with one or more of a plurality of communication links such that the one or more of the plurality of communication links affected must be removed from service.

If noise element has not exceeded second noise threshold in step 222, then the monitoring of noise element continues per the return arrow. If noise element has exceeded second noise threshold in step 222, then it is determined if the affected link is the last link in a multi-link bundle in step 224. If so, in optional step 226, the last link is not removed from service per step 226. Step 226 may be optional depending on the preferences of a system administrator as to whether it is best to preserve the last communication link or to transfer traffic to a different BTS. If the affected link is not the last link, then it is removed from service and a second alert notification may be communicated to network management system, mobile switching center, a system administrator, and the like, notifying of the removal of the affected one or more communication links per step 228.

In step 230, it is determined if noise element has dropped below second noise threshold. If not, monitoring is continued per the return arrow. If so, the one or more affected communication links previously removed from service are restored and a restoration alert notification may be communicated to network management system, mobile switching center, a system administrator, and the like, per step 232.

Some of the steps illustrated in FIGS. 2A and 2B may be changed or deleted where appropriate and additional steps may also be added to the flowchart. These changes may be based on specific communication system architectures or particular networking arrangements or configurations and do not depart from the scope or the teachings of the present invention.

In addition, although the preceding description offers a noise monitoring module 115 to be implemented with particular devices (e.g. aggregation node 112 or cell site element 106), the noise monitoring module 115 provided may be embodied in a fabricated module that is designed specifically for effectuating the monitoring techniques as provided above. Moreover, such a module may be compatible with any appropriate protocol and communication links other than T1/E1 links, which were offered for purposes of teaching and example only.

Additionally, although some example embodiments provided above may reference voice data, communication system 100 may cooperate with any other type of data in which monitoring protocols are applicable. For example, normative or standard data, video data, and audio-visual data may benefit from the teachings of the present invention. Communication system 100 is adaptable in that it may be used in conjunction with any information that is sought to be compressed in a communications environment.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to the problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A method of managing a communication link, comprising:
   monitoring at least one of a plurality of physical links and a plurality of communication links associated with a plurality of data communications, wherein the plurality of communication links correspond to the plurality of physical links;
   calculating a statistical quantity of a noise element of a selected one or more of the plurality of physical links and the plurality of communication links at a plurality of first time intervals, wherein the statistical quantity comprises one of an average and a weighted average of each of a standard deviation of the noise element for one or more of the plurality of physical links and the plurality of communication links calculated at two or more of the plurality of first time intervals;
   measuring the noise element of the selected one or more of at least one of the plurality of physical links and the plurality of communication links at a second time interval;
   determining whether the noise element measured at the second time interval has exceeded a first noise threshold; and
   communicating an alert notification to a network entity when the first noise threshold is exceeded.

2. The method of claim 1, wherein the statistical quantity comprises a standard deviation of the noise element.

3. The method of claim 1, wherein the first noise threshold comprises a user threshold minus the statistical quantity.

4. The method of claim 1, wherein the noise element is selected from a group consisting of:
   a time interval associated with one or more of at least one of the plurality of physical links and the plurality of communication links;
   an amount of errors associated with one or more of at least one of the plurality of physical links and of the plurality of communication links;
   a percentage of errors associated with one or more of at least one of the plurality of physical links and of the plurality of communication links; and
   a number of errors associated with one or more of at least one of the plurality of physical links and of the plurality of communication links.

5. The method of claim 1, further comprising:
   determining if the noise element measured at the second time interval has exceeded a second noise threshold; and
   if so, removing one or more of the plurality of communication links associated with exceeding the second noise threshold, and communicating a second alert notification.

6. The method of claim 5, wherein if a communication link associated with exceeding the second noise threshold is a last link in a multi-link bundle, it is not removed.

7. The method of claim 5, further comprising, restoring the one or more of the plurality of communication links associated with exceeding the second noise threshold when the noise element drops below the second noise threshold and communicating a restoration alert notification.

8. The method of claim 1, further comprising:
   determining if the noise element has dropped below the first noise threshold; and
   if so, communicating a stable traffic pattern notification.

9. An apparatus for managing a communication link, comprising:
   at least one of a cell site, a base transceiver station and an aggregation node operable to communicate data;
   a noise monitoring module included with the at least one cell site, base transceiver station and aggregation node, wherein the noise monitoring module is operable to monitor at least one of a plurality of physical links and a plurality of communication links associated with a plurality of data communications, wherein the plurality of communication links correspond to the plurality of physical links, and execute a link analysis comprising:

calculating a statistical quantity of a noise element of a selected one or more of at least one of the plurality of physical links and the plurality of communication links at a plurality of first time intervals, wherein the statistical quantity comprises one of an average and a weighted average of each of a standard deviation of the noise element for one or more of the plurality of physical links and the plurality of communication links calculated at two or more of the plurality of first time intervals;

measuring the noise element of the selected one or more of at least one of the plurality of physical links and the plurality of communication links at a second time interval;

determining whether the noise element measured at the second time interval has exceeded a first noise threshold; and communicating an alert notification to a network entity when the first noise threshold is exceeded.

10. The apparatus of claim 9, wherein the statistical quantity comprises a standard deviation of the noise element.

11. The apparatus of claim 9, wherein the first noise threshold comprises a user threshold minus the statistical quantity.

12. The apparatus of claim 9, wherein the noise element is selected from a group consisting of:

a time interval associated with one or more of at least one of the plurality of physical links and the plurality of communication links;

an amount of errors associated with one or more of at least one of the plurality of physical links and the plurality of communication links;

a percentage of errors associated with one or more of at least one of the plurality of physical links and the plurality of communication links; and a number of errors associated with one or more of at least one of the plurality of physical links and the plurality of communication links.

13. The apparatus of claim 9, wherein the noise monitoring module is operable to determine if the noise element measured at the second time interval has exceeded a second noise threshold, and if so, remove one or more of the plurality of communication links associated with exceeding the second noise threshold, and communicate a second alert notification.

14. The apparatus of claim 13, wherein if a communication link associated with exceeding the second noise threshold is a last link in a multi-link bundle, it is not removed.

15. The apparatus of claim 13, wherein the noise monitoring module is operable to restore the one or more of the plurality of communication links associated with exceeding the second noise threshold when the noise element drops below the second noise threshold, and communicate a restoration alert notification.

16. The apparatus of claim 9, wherein the noise monitoring module is operable to determine if the noise element has dropped below the first noise threshold, and if so, communicating a stable traffic pattern notification.

17. A computer-readable medium containing computer instructions for instructing a processor to perform a method of managing a communication link, the instructions comprising:

monitoring at least one of a plurality of physical links and a plurality of communication links associated with a plurality of data communications, wherein the plurality of communication links correspond to the plurality of physical links;

calculating a statistical quantity of a noise element of a selected one or more of at least one of the plurality of physical links and the plurality of communication links at a plurality of first time intervals, wherein the statistical quantity comprises one of an average and a weighted average of each of a standard deviation of the noise element for one or more of the plurality of physical links and the plurality of communication links calculated at two or more of the plurality of first time intervals;

measuring the noise element of the selected one or more of at least one of the plurality of physical links and the plurality of communication links at a second time interval;

determining whether the noise element measured at the second time interval has exceeded a first noise threshold; and communicating an alert notification to a network entity when the first noise threshold is exceeded.

18. The computer-readable medium of claim 17, wherein the first noise threshold comprises a user threshold minus the statistical quantity.

19. The computer-readable medium of claim 17, further comprising:

determining if the noise element measured at the second time interval has exceeded a second noise threshold; and if so, removing one or more of the plurality of communication links associated with exceeding the second noise threshold, and communicating a second alert notification.

20. The computer readable medium of claim 19, wherein if a communication link associated with exceeding the second noise threshold is a last link in a multi-link bundle, it is not removed.

21. The computer-readable medium of claim 19, restoring the one or more of the plurality of communication links associated with exceeding the second noise threshold when the noise element drops below the second noise threshold and communicating a restoration alert notification.

22. The computer-readable medium of claim 17, further comprising:

determining if the noise element has dropped below the first noise threshold; and if so, communicating a stable traffic pattern notification.

* * * * *